March 11, 1930.                G. W. PIERCE                1,750,124
                         VIBRATORY SYSTEM AND METHOD
                      Filed Jan. 3, 1927        4 Sheets-Sheet 1
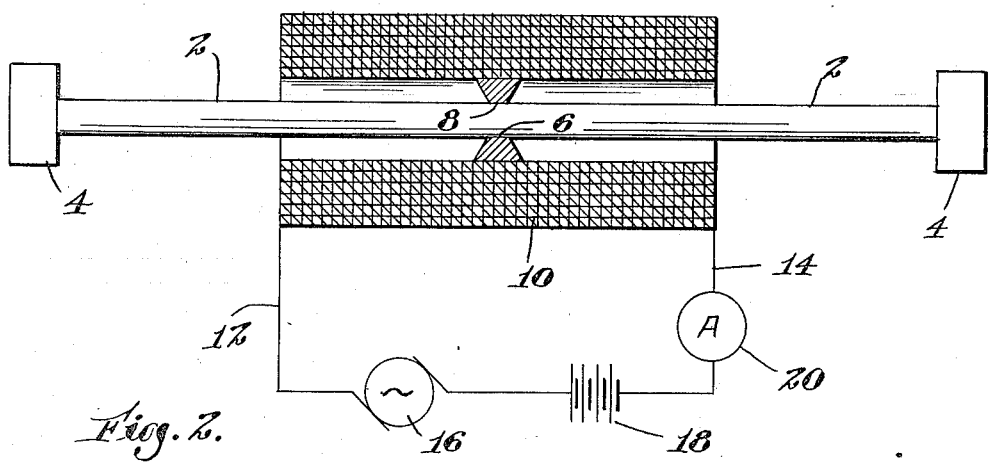
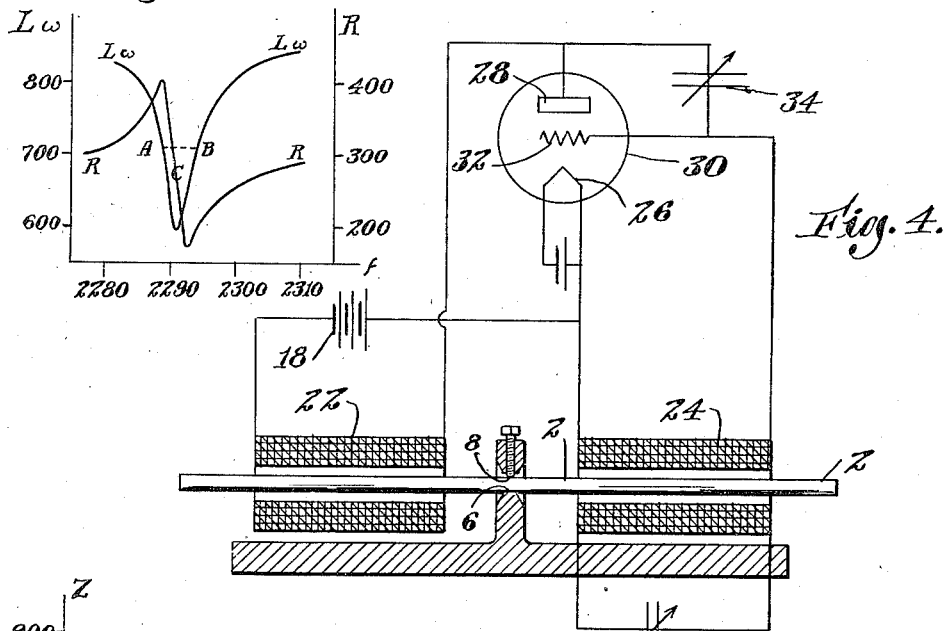
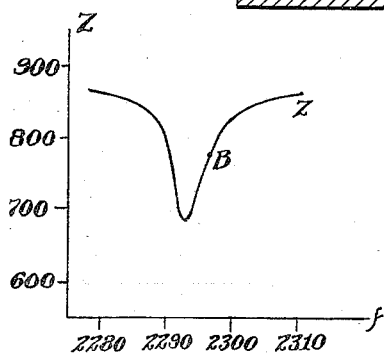
Inventor
George W. Pierce
by David Rines
Attorney

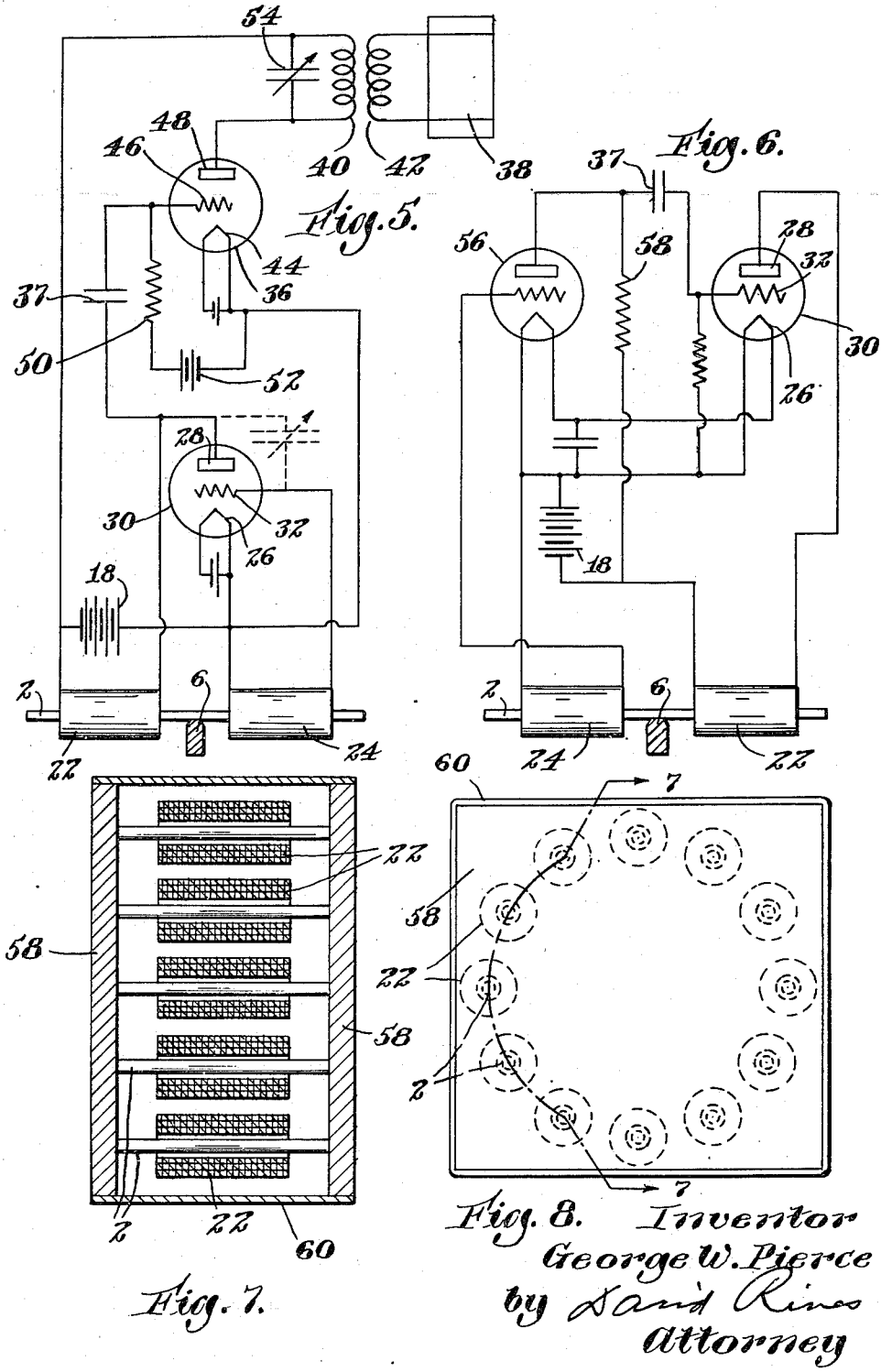

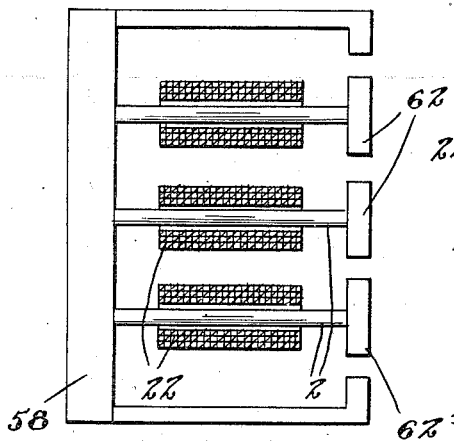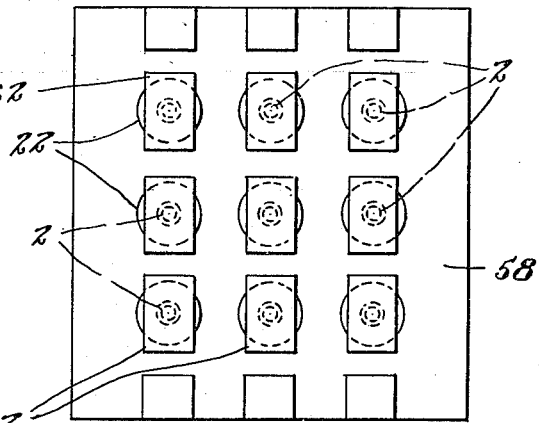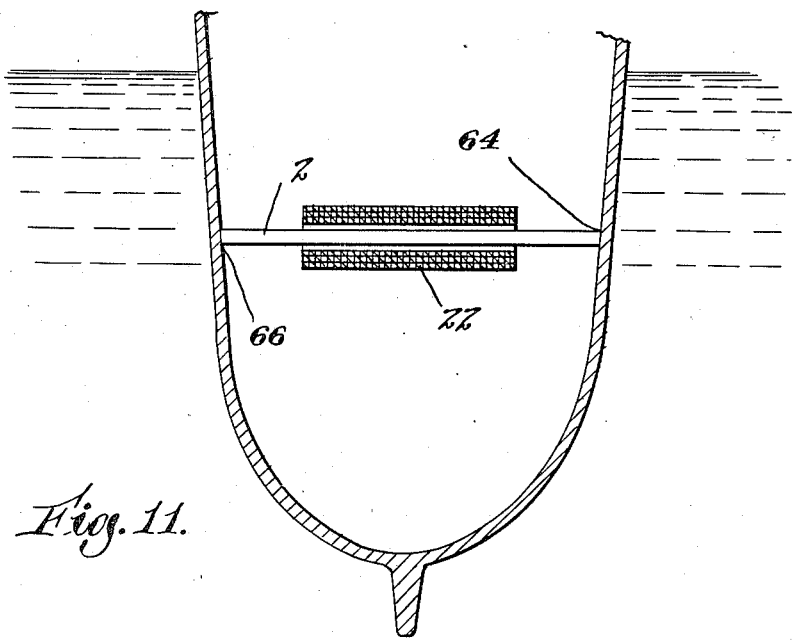

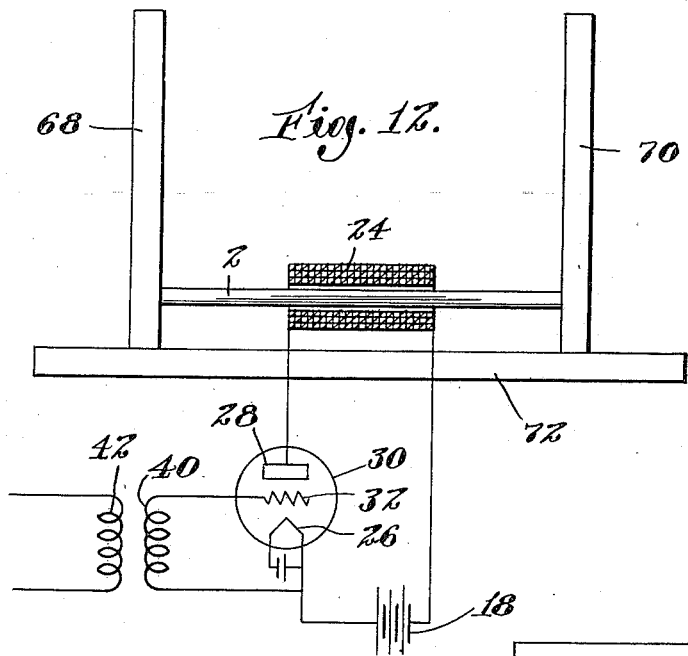
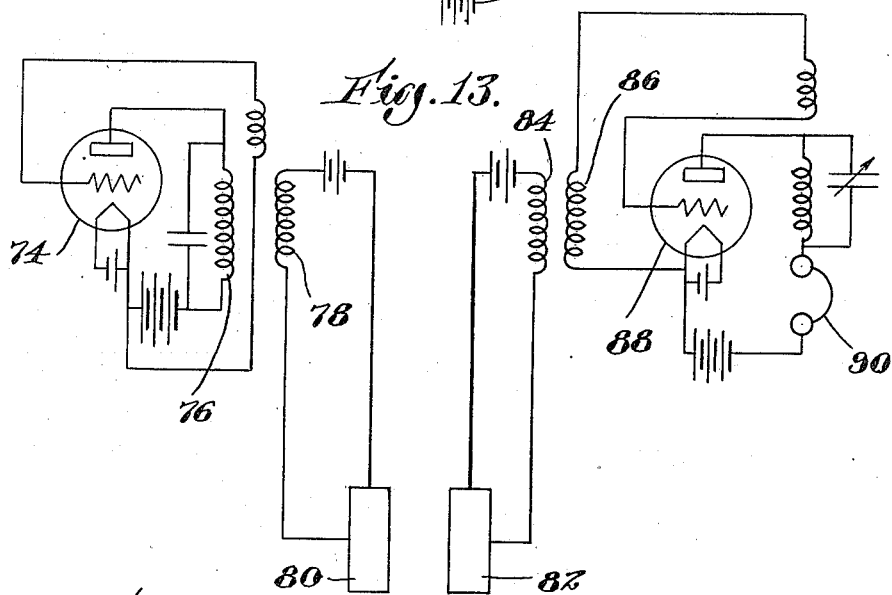
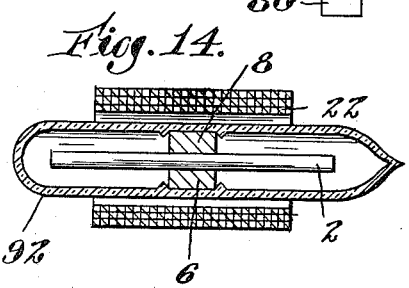

Patented Mar. 11, 1930

1,750,124

UNITED STATES PATENT OFFICE

GEORGE W. PIERCE, OF CAMBRIDGE, MASSACHUSETTS

VIBRATORY SYSTEM AND METHOD

Application filed January 3, 1927. Serial No. 158,452.

The present invention relates to vibratory methods, systems and apparatus, and more particularly to methods of and systems and apparatus for producing, sustaining, transmitting, receiving, and the like, electric, magnetic and mechanical oscillations. From a more limited aspect, the invention relates to the frequency-control and the frequency stabilization of the electric oscillations of electric circuits, and to the transfer of periodic, electric energy from one electric system to another.

According to the specific embodiments of the invention hereinafter described and illustrated in the accompanying drawings, these results are obtained by the interaction between the electric circuit or circuits and a mechanically vibrating member of novel construction the mechanical vibrations of which control the frequencies of the electric oscillations of the electric circuit or circuits. Electromechanical vibrators for bringing about such results are not, broadly, new. Piezo-electric crystals are admirably adapted for this purpose. The use of such crystals, however, involves certain disadvantages. In the first place, they are quite expensive and laborious to make and in the second place, there is always danger that a little extra load will cause the crystal to become shattered, destroying, in a fraction of a second, a comparatively costly instrument that required a long time to produce. To avoid this result, complications must be resorted to, but these, in turn, impair the efficiency of operation and there are also other disadvantages.

The novel vibrator of the present invention has none of these disadvantages and, furthermore, it operates upon an entirely different principle. It is adapted, when stimulated magnetically, as by means of an electromagnetic field, to become very slightly mechanically deformed or distorted by magnetostriction. The resulting increment of deformation may be a lengthening, or a shortening, or some other distortion, depending on the material and on the polarity of the increment of the magnetic field. Conversely, when the vibrator is mechanically deformed or distorted, it will react or respond magnetically by magnetostriction with an increment of magnetization depending upon the nature of the preexisting magnetic field and the mechanical deformation. Both with the novel vibrator of the present invention and with piezo-electric crystals, the mechanical deformations are excited by reversible internal stresses set up therein and which readily recover on the withdrawal of the deforming forces.

The invention will be explained in greater detail in connection with the accompanying drawings, in which Fig. 1 is a diagrammatic view of apparatus and circuits constructed and arranged to illustrate the principle of the present invention; Figs. 2 and 3 are plots of experimental results; Fig. 4 is a diagrammatic view similar to Fig. 1, illustrating the invention as applied to a vacuum-tube oscillator for producing sustained vibrations and alternating currents; Fig. 5 is a similar diagrammatic view, illustrating the system of Fig. 4 in connection with an amplifier for supplying a load: Fig. 6 is a similar view, illustrating one of the coils in the input circuit and the other in the output circuit of a resistance-condenser-coupled amplifier unit of two tubes; Fig. 7 is a section of a vibrator particularly designed for producing sound in water, the section being taken upon the line 7—7 of Fig. 8, looking in the direction of the arrows; Fig. 8 is an elevation of the same; Figs. 9 and 10 are views similar to Figs. 7 and 8, respectively, of a modification; Fig. 11 is a diagrammatic cross-section of a ship, showing a vibrator spanning the hull thereof to produce sound in the water by operation through the ship's plates; Fig. 12 is a diagrammatic view of a vibrator for producing sound vibrations in the air; Fig. 13 is a diagrammatic view of a transmitting-and-receiving system according to the present invention; and Fig. 14 is a diagrammatic view illustrating the vibrator mounted in a vacuum.

A core 2 is shown axially positioned within an inductive and resistive field coil, indicated in various figures by the numerals 10, 22 and 24. The core 2 may be in the form of a tube, as is illustrated and described in a copending application, Serial No. 202,086, filed June 28, 1927, or a rod, as is illustrated in the accompanying drawings. The core 2 may freely rest centrally upon a support 6, as shown in Figs. 5 and 6, or it may be centrally clamped between the support 6 and a second clamping member 8, as illustrated in Figs. 1 and 4, or it may be otherwise supported, as shown in other figures. When an electric current is passed through the coil, a magnetic field will be established that will cause mechanical distortion or deformation of the core 2 by magnetostriction. This action of the magnetic field upon the core 2 will, for brevity, be hereinafter termed "stimulation". Conversely, any mechanical deformation of the rod or tube will cause a magnetostrictive reaction upon the electromagnetic field, and this will have its effect upon the electric current or voltage in the coil. This reaction will, for brevity, be hereinafter referred to in the specification and the claims as the "response".

If the current or voltage is alternating, the electromagnetic field created thereby will also be alternating. The core 2 will, therefore, increase and decrease in length (let us say) many times a second, every variation in the current producing its stimulative effect on the rod or tube 2, and every deformation of the rod or tube producing its reaction response upon the current. The core 2 will, in consequence, freely vibrate mechanically by magnetostriction about a nodal point at its center with a period of vibration equal to the period of the alternating electromotive force. Ordinarily, these vibrations will be quite small. When the alternating frequency is close to, or substantially the same as, the natural frequency of mechanical vibration of the core 2, however, the amplitude of vibration of the core, though still small, becomes relatively quite large. The rod will then react inductively on the load to render its consumption of power critical as to frequency for frequencies near the free frequency of the rod. The mechanical damping of the rod, mounted as shown, is as small as possible, with the result that the resonant response of the rod is very sharp and pronounced. Of course, there will usually be more than one specific frequency of magnetization at which the rod will thus resonate, as is explained hereinafter.

In Fig. 1, the magnetostrictive core 2 is shown driven by a solenoid coil 10, provided with conductors 12 and 14 by which it may be connected, for simplicity, in series with a source of alternating electromotive force, such as an alternating-current generator 16. Other, more complicated, sources of alternating current are illustrated in other figures.

A local battery 18 (shown in Fig. 1 in series with the source 16 and the winding 10) applies a steady magnetizing field to the rod 2, over which the alternating field produced by the generator 16 is superposed. The alternating field is preferably smaller than the steady field, in order that the combined fields may not, at any time, fall to zero. The battery may be dispensed with, and the core may be magnetized electromagnetically from a local source, or it may be permanently magnetized, instead, or the battery and a permanently magnetized rod may be employed together.

In order not to complicate the showing of Fig. 1, no means are illustrated therein for tuning the circuit or varying the frequency of the alternating current flowing therein, particularly as the core 2 may itself be a tuned element of very low decrement, thereby dispensing with or supplementing electrical tuning of the circuits. It will be understood that a tuning condenser or other tuning device may be used, thereby attaining greater sensitiveness and selectivity. If this frequency is varied gradually by this tuning device, or by variation of the speed of the generator, from a value on one side of the natural or resonant frequency of mechanical vibration of the rod, to a value on the other side of this frequency, a comparatively intense sound is produced somewhere in this range, if the resonant frequency is within audible limits. If the frequency is outside the audible range, the resonant response is made manifest by a transient sound, or click, in the telephones, or by a change in the reading of an ammeter 20 connected in circuit. This resonant response takes place whenever the tuning of the electromotive force passes through values synchronous with the period of the vibrator, setting the vibrator into violent vibrations; or, in more technical language, the approximate equality of the frequency of the applied electromotive force and that of the rod is indicated by singular values of the impedance of the system. The invention, therefore, finds one application as a very accurate frequency meter or indicator. By filing the resonator down, or adding to its mass by solder or plating, any desired frequency may readily be attained, either high or low, and the frequency meters calibrated accordingly. Once calibrated by comparison with a standard frequency meter, they will then serve as very accurate meters themselves. Further illustrations of this operation will appear in connection with a discussion of the other figures of the drawings.

The operation will be better understood in connection with the plot of Fig. 2, showing the relation between the resistance $R$ and the reactance $L\omega$ of the winding 10 for different frequencies of applied electromotive force in the neighborhood of the natural or free frequency of the rod. The axis of abscissæ represents the applied frequency $f$ (number of cycles per second) of the electromotive force, and the ordinate is, in the case of one curve, the reactance $L\omega$, and in the other, resistance $R$, both measured in ohms. The particular rod employed in the experiment was of nickel-steel, about 0.92 cm. long, and had a free frequency of fundamental longitudinal vibration of about 2290 cycles per second. As the curves of Fig. 2 clearly show, the reactance $L\omega$ and the resistance $R$ undergo marked effects, the former sinking to a minimum in the neighborhood of the resonant frequency of the rod, and the latter at a frequency somewhat greater.

In Fig. 3, the total impedance $Z$ of the winding 10 is similarly plotted against the applied frequency $f$ of the electromotive force. The values of $Z$ shown in this plot were obtained by taking the square root of the sum of the squares of the resistance $R$ and the reactance $L\omega$ of Fig. 2. According to this plot, the impedance $Z$ of the winding 10 is at a minimum at a frequency of about 2291 cycles per second. The ammeter 20 in the circuit of Fig. 1 will therefore indicate a maximum of current when the generator frequency has this value.

In the neighborhood of this resonant frequency, the power output of the generator undergoes a large increase. Assuming, therefore, that the generator is running at a speed a littel too slow to give maximum power, and that the generator increases in speed, the draft of power from the generator by the load will increase, and tend to slow the generator down. If, on the other hand, the generator speed tends to decrease, the load will decrease also, and this will tend to maintain the generator speed high. The vibration of the magnetomechanical vibrator thus acts to stabilize the generator, and a second application of the invention, therefore, is to stabilize the frequency of an alternating-current system. By using a sufficiently massive magneto-mechanical vibrator, with a correspondingly large impedance in the circuit, this stabilizing effect may be made very large.

Any material having suitable properties may, of course, be used for the vibrating body 2, but it should obviously be constituted of material that is suitably magnetizable. A simple rod or tube of the proper material will operate; but to obtain the best results, depending upon the purpose for which the apparatus is used, the rod or tube should be characterized by comparatively large magnetostrictive effects and comparatively low vibrational decrement. Such effects exist in magnetic metals and magnetic alloys. Different bodies possess the requisite properties in different degrees. Alloys containing nickel, chromium and iron, in proper proportions, have comparatively large magnetostriction. Ordinary metals have their elasticity and density slightly modifiable by changes in temperature. Such temperature changes, therefore, introduce small variations in the natural period of mechanical vibration of such bodies. To obtain substantially constant frequency, it is preferred to utilize a vibrator having a coefficient of elasticity that varies as little as possible with variation of temperature. Certain alloys of iron, nickel and chromium are known to possess substantially constant coefficients of elasticity with variations of temperature. One such alloy, constituted of 52% iron, 36% nickel and 12% chromium, is practically independent of temperature. I have found that a rod of nickel, chromium and iron has a period that is also practically independent of magnetic field strength over wide limits. Cores of nickel, nickel steel and chrome steel have large magnetostrictive effects. Annealed rods, according to my experiments, give the best results.

If high precision of frequency is desired, the metal should have a high constancy of elasticity. If great sensitiveness, rather than high precision, is the aim, the metal may have less constancy of elasticity, but higher sensitivity.

If the vibrator is in the form of a rod or tube of small diameter, the period of vibration is nearly proportional to the length of the rod or tube. Thus, a rod of nickel-steel, known in the trade as "Stoic" metal, having a diameter of one-half centimeter and a length of ten centimeters, has a fundamental period of longitudinal vibration of about 1/21,000 of a second. A rod of the same diameter ten times as long (100 centimeters) has a period about 1/2100 of a second. Rods of the same diameter and the same two respective lengths, but constituted of an alloy of iron and chromium in a particular proportion, have the fundamental periods of 1/27,000 and 1/2700 of a second, respectively. These results are consistent with the fact that the two materials have different elasticities and densities.

The above figures correspond to but a single mode of vibration of the rods. But all vibratory bodies have also additional modes of vibration. The core has one or more natural fundamental frequencies of mechanical vibration, and it also has frequencies of vibration determined by the operation of the rod in halves, thirds, fourths, fifths and other overtones. Such other modes of vibration may be produced by particular methods of stimulating the vibrations, or by particular modes of clamping the body. In addition to other modes of longitudinal vibration, there are certain magnetostrictive effects attendant upon the twist or torsion of the rods, so that torsional vibrations are also available. All these modes and kinds of vibration may be utilized according to the present invention.

And, of course, it will be understood that the invention is not restricted to the use of vibrators in the form of rods or tubes. The magneto-mechanical vibrator of the present invention may, for example, be constituted of a rod with heavy weights 4 attached to the ends thereof, as shown in Fig. 1. This will effectively decrease its period of vibration to a comparatively low frequency. As a further example, the vibrator may be constituted of a plurality of small wires embedded as a unit in a highly elastic binding material, or attached together by solder or by welding in suitable spots, as at their centers or ends.

The vibrator may be used as a transformer to couple several circuits together in order to transmit energy from one circuit to another at a given frequency. When an alternating current of the critical frequency flows in one circuit, it will cause the vibrator to vibrate energetically and thus transmit energy to the other circuit. Thus, in the system of Fig. 4, the core 2 is positioned axially of a magnetic field, here shown as produced by coils 22 and 24, and is preferably held in such manner, as by means of the centrally positioned clamps 6 and 8, as freely to vibrate longitudinally about a nodal point at its center. For symmetry, one of the coils is positioned on one side of the middle of the rod or tube 2 and the other on the other side. The coils may be compacted near the center of the rod, or they may be separated or spread out, each over the whole region of the half-length of the rod, or they may be replaced by a single coil. The coil 22 is connected, in series with the local battery 18, between the filament or cathode 26 and the plate or anode 28, in the output or plate circuit of a vacuum tube 30. The coil 24 is similarly connected in the input or grid circuit of the tube, between the filament 26 and the grid or third electrode 32. The coils 22 and 24 thus form electrical paths between the filament and the plate, and between the filament and the grid, respectively. The grid and the plate may, if desired, be spanned by a variable condenser 34; or the tuning condenser may be connected in parallel with one or the other of the coils 22 and 24; or, if the coils are suitably designed, the condenser may be omitted altogether. An electric vacuum-tube oscillator is thus provided, having considerable similarity to oscillators of the prior art. The new oscillator, however, comprises a very important novel feature in the transformer for coupling the input circuit and the output circuit together, and comprising the coils 22 and 24 and the mechanically tuned core of magnetizable material for transforming resonant electric energy and feeding it from the output circuit to the input circuit. This transformation of energy is effected, at constant frequency, through the effects produced by the distortion or deformation of the core, as will presently be explained. The tuning is such that high selectivity of frequency is possible in the transfer of energy from one circuit to another. The local battery 18 may serve to supply the plate current, as well as to polarize the vibrator. For high-frequency oscillations, the winding of one of the coils 22 and 24 may be reversed as compared with the other winding, and as compared with the arrangement of oscillators of this character as usually constructed. The reversal of the coil is not necessary in all cases, but it has the advantage of making the oscillations much larger and more stable and preventing parasitic electric oscillations by electric feed back, and of restricting the oscillations to periods determined by the mechanically-tuned core or rod.

The system of Fig. 4 may be operated somewhat as follows: For certain settings of the condenser, the system will oscillate at variable frequency, like any other system of like construction and arrangement, and entirely independently of the rod. When, however, the setting of the condenser corresponds to a frequency approximating the natural frequency of the rod, the frequency of the alternating current will fall into step with the frequency of the rod. When this happens, the condenser may be varied over a comparatively wide range, or even removed altogether, without destroying the frequency of the alternating current and the system will oscillate at a frequency determined by the frequency of mechanical vibration of the core 2. Here the rod acts as a stabilizer of the frequency, the frequency of the oscillations being substantially constant and equal to the natural frequency of mechanical vibration of the core.

Or, the system may operate as follows: Let it be assumed that the magneto-mechanical vibrator is held or damped so as to prevent its vibrations, and that the circuits are so arranged that the system will not oscillate under such conditions. This may readily be effected by preventing feed back between the coils 22 and 24 due to their opposed winding, or their small mutual inductance, or because of their high losses brought about by the presence of the magnetizable core, or because of the condenser setting, or for other reasons. With the rod in this damped, immobile state, there is no tendency for vibrating currents to appear in the system. Let the damping of the rod be now removed. As soon as the rod is free to vibrate, its compression on a small disturbance generates an electromotive force in the grid coil 24. This starts a variable current in the plate coil 22 and further stimulates the rod. The magnetization of the plate coil causes the rod to lengthen, or shorten, or twist, or become otherwise distorted. This distortion is transmitted along the rod to the other half of the rod,— the half that started the disturbance,—where it develops a change of magnetization and consequently generates a further electromotive force in the grid coil (assuming a proper design of the circuits). This dual rôle thus played by the rod causes the rod to vibrate and the otherwise non-oscillatory system to oscillate and sustain the oscillations at a frequency determined by the frequency of mechanical vibration of the rod. The rod here actually produces the oscillations by its co-operation with the system. It is characteristic of the system that very small changes of frequency can be brought about only by very large modifications of circuit constants.

It is not essential that a vacuum tube be employed to produce oscillations, as is explained in the said copending application, Serial No. 202,086, filed June 28, 1927.

Of course, the operativeness of the invention does not depend upon the theories that may be advanced to explain it, and such theoretical explanations are advanced merely to make the invention more clearly understood by persons skilled in the art.

In order that the above-described electromotive force may be generated properly in the grid coil, and with the proper phase for stimulating continuous oscillations, coils of the proper character must be connected in the circuit in the proper direction, and the condenser may need to be properly adjusted. Whether the coils 22 and 24 should be wound in one direction or the other depends on the mutual capacity of the coils and on the lag of magnetization with respect to the magnetizing force, and may be determined by experiment with given materials.

I have operated a system of this character from frequencies as low as 600 per second, with weighted rods, to as high as 51,000 per second, with unweighted rods 4 centimeters long and 5 to 7 millimeters in diameter. The coils used at the 600-cycle frequency had about 5 henries inductance each, when measured with no iron at the core, and those used at 51,000 cycles had about 0.03 henries inductance each, without iron. To extend the range to higher or lower frequencies, it is merely necessary to adjust the coils and the dimensions of the vibrator. By proper choice of length and other dimensions, the apparatus is applicable to systems of high or low frequency within a range that may extend from a hundred cycles to hundreds of thousands of cycles.

The novel transformer of the present invention may obviously be used to transfer energy between other circuits than the input and the output circuits of the vacuum tube illustrated in Fig. 4. The mechanical vibration of the rod may be utilized as a source of energy for this purpose,—for example, as a source of sound; or the electrical alternating currents may be utilized,—for example, to induce electromotive force in some other circuit or coil brought up near to, or wound about, the coil 22. It will also be clear that instead of the fundamental frequency, any harmonic of the resultant electrical oscillations may be utilized; and, vibrations other than the fundamental longitudinal frequency of the rod may also be employed.

The energy from the output circuit may be transmitted to an amplifier 36, as shown in Fig. 5, in any desired manner, as by capacity coupling and the amplified current in the output circuit of the amplifier may be supplied to any desired load 38. The potential drop in the coil 22 may be utilized to act upon the grid-filament path of the amplifier 36 through a blocking condenser 37. The load may be any device requiring periodic current, such as a wireless transmitting station, a carrier or other telephone line, a motor, a sound radiator, a lamp, a Geissler tube, a revolution counter, a clock mechanism, etc. Thus, a clock may be driven at a low frequency of 1000. A motor may suitably be synchronized at this or any other frequency. In wired-wireless work, the oscillator may produce a carrier wave of, say, 20,000 to 45,000 cycles. The amplified energy may be transmitted to the load, either directly, or, as illustrated, through a transformer 40, 42. The load may be further amplified, before it is utilized, by means of a further amplifier tube. The primary coil 40 of the transformer is shown in the plate circuit of the amplifier 36, and the secondary coil 42 is shown connected with the load 38. The amplifier 36 is illustrated as of the vacuum-tube type, comprising three electrodes, namely, a filament 44, a grid 46 and a plate 48. A grid-leak resistor or reactor is illustrated at 50 and a biasing battery at 52. The battery 18 is utilized as a source of plate-current supply for both the tubes 30 and 36, besides affording the polarizing magnetization for the core 2. A tuning condenser 54 in the output circuit of the amplifier may be used to resonate and augment the output alternating current either at its fundamental frequency or, if preferred, it may resonate, select and augment some harmonic of the output frequency, and thereby apply the harmonic frequency to the load.

The tube 56 shown in Fig. 6 is resistance-condenser-coupled to an amplifier tube 30 by a resistor or reactor 58, the blocking condenser being shown at 37, as in Fig 5. The coil 22 is in the plate circuit of the tube 30, as before described, but the coil 24 is in the grid circuit of the tube 56. The oscillations are produced by the cooperation of the vibrator with the two tubes 30 and 56. The vibrator communicates its own natural-period voltage impulses to the coil 24 in the grid circuit of the tube 56 and receives impulses of the same frequency from the coil 22 of the other tube. Condensers, not shown, may be connected about either of the coils, or from the plate terminal of one coil to the grid terminal of the other coil. This arrangement produces enhanced sensitiveness, or limits the effects so that the tubes are not overloaded.

The present invention is further adapted, as a sonic oscillator, for the production and reception of sounds of any desired frequency, particularly high frequencies, for communicating through water or other dense media. A plurality of tubes or rods 2 of highly magneto-strictive material are shown attached to one or more sound-radiating faces 58, Figs. 7 to 10. The rods or tubes 2 are surrounded by coils 22 that may be connected together, either in parallel or in series, as desired, and through which are passed an actuating periodic current superposed over a magnetizing direct currents as before described. The fields of adjacent coils are preferably reversed so that the lines of force go to the right through one set of rods and to the left through the alternately placed set of rods. The magnetizing current may be passed through auxiliary coils, if desired. The rods are preferably free from contact with the coils, so as to reduce friction, which prevents free vibration. The mechanical system is tuned to the desired frequency, in the medium in which it is to be used. The chamber in which the coils are contained is sealed against the entry of water when submerged, as by means of a yielding, cylindrical band 60.

In the modification of Figs. 9 and 10, one of the radiating faces is constituted of the free ends of the rods, each having a small cap-plate 62.

According to the modification of Fig. 11, the magneto-strictive rod or wire 2 is attached to the inner opposite sides 64 and 66 of a ship. These sides will themselves act as sound radiators through the water when a properly tuned, alternating current is sent through the coils 22. Here the frequency will be low, as for audible signalling. As before explained, the magnetostrictive element should be polarized by a direct-current battery, or through an auxiliary winding.

The invention is, of course, equally adapted for producing sound vibrations in the air so as to constitute a loud speaker. Sound-radiating wings for this purpose are illustrated at 68 and 70 in Fig. 12. These may be parts of a sounding box, properly shaped, proportioned and mounted for quality. The rod or wire 2 is preferably connected to the wings 68 and 70 near their points of attachment to their connecting base 72. In this manner, the free ends of the wings will have a larger amplitude. The coil 24 of the apparatus may be connected in the output circuit of a vacuum tube, as shown in Fig. 12, or as illustrated in Fig. 1.

A sending-and-receiving system is illustrated in Fig. 13, using sound as the agency of communication. The transmitting apparatus comprises a vacuum tube 74, the output circuit of which is provided with a coil 76 that is coupled to a coil 78. The energy of the vacuum tube is thus magnetostrictively transmitted to a radiating face 80, such as is disclosed in Figs. 7 to 12. The sound so radiated is received by the radiating face 82 of a receiving system and is magnetostrictively connected with an electromotive force in the coil 84. The coil 84 is coupled to a coil 86 of a receiving vacuum tube 88 that is connected with a telephone 90. If the sound frequency employed is above the audible range, the heterodyne principle may be used to render the signal audible. Instead of the inductive coupling shown in Fig. 13, other methods of coupling used in related arts may be employed.

If desired, the vibrator of the present invention may be sealed in a vacuum, as in an enclosed chamber 92, Fig. 14. The chamber walls may surround the vibrator and be enclosed in the coil, without any connecting wires leading into the enclosure. The vacuum reduces the damping and obviates rusting and accumulation of dust so that the constancy of vibration is thus preserved for precision work. Also the container eliminates the annoyance of sound radiation, when the device is used for electrical purposes in the audible range.

It will be noted that when vibrating at its fundamental frequency, the two halves of the rod are driven by equal and oppositely acting forces, so as to communicate no motion to the clamp and its base. The apparatus is, therefore, free from one of the sources of trouble and irregularity of tuning forks, the periods of vibration of which are affected by the table or other support on which they are placed.

So well does the present vibrator balance itself that I find that the clamp 6, 8 may be dispensed with and a mere rest take its place, as shown in Figs. 5 and 6. With this arrangement the frequencies may be changed at will by merely pulling out one rod and replacing it by another.

It is evident that hysteresis and eddy currents in the rod act in a detrimental manner at high frequency, and this suggests the desirability of using a tube in place of a rod, as is illustrated and described in the said copending application Serial No. 202,086, filed June 28, 1927. The tube may be split lengthwise to further reduce eddy currents. Also, a bundle of smaller rods imbedded in a highly elastic insulating material is an evident means of reducing eddy currents. I find, however, that at frequencies as high as 51,000 cycles per second, which is the highest frequency yet tried, a solid nickel-steel or chromium-steel rod is highly efficient even when its diameter is as large as ¼ inch, and though used in magnetizing coils that have a clearance of more than ¼ inch all around the rod.

By diminishing this clearance and using rods of smaller diameter and shorter lengths, the upper limit of frequency can be greatly raised, and then properly constructed comminuted cores with elastic binding material will serve still further to raise the limit of available frequencies.

Other uses, also, will readily suggest themselves, such as for stroboscopic instruments. To persons skilled in the art many applications and modifications within the spirit and scope of the invention will occur, and no effort has here been made to be exhaustive.

What I claim is:

1. A magnetostrictive mechanically-tuned alternating-current system comprising a magnetostrictive vibrator with windings magnetically cooperative with said vibrator, a vacuum tube having plate, grid and filament, a part of said windings being in the plate-filament circuit and a part of said windings in the grid-filament circuit to produce sustained vibrations, a natural frequency of mechanical vibration of the vibrator being substantially equal to a predetermined frequency of the alternating current of the system.

2. A magnetostrictive mechanically-tuned alternating-current system comprising a magnetostrictive vibrator with windings magnetically cooperative with said vibrator, a vacuum tube having plate, grid and filament, a part of said windings being in the plate-filament circuit and a part of said windings in the grid-filament circuit to produce sustained vibrations with a frequency determined by said vibrator.

3. A magnetostrictive mechanically-tuned alternating-current system comprising a magnetostrictive vibrator with windings magnetically cooperative with said vibrator, a vacuum-tube amplifier train having two or more vacuum tubes, a part of said windings being in the input circuit of a vacuum tube of said train, and a part of said windings being in the output circuit of a vacuum tube of said train.

4. A transformer having a magnetostrictive mechanically-tuned core, a vacuum-tube device having an output circuit and an input circuit, said transformer acting between the output and the input circuits of the vacuum-tube device to constitute a stabilized oscillator, means for amplifying the output currents of said oscillator and means for selecting harmonic constituents of current.

5. An oscillator system comprising a space-current device having an anode, a cathode and an electrode for controlling the flow of space current between said cathode and said anode in accordance with variations of the potential of said electrode, and magnetostrictive means for controlling variations of the potential of said electrode to cause the system to oscillate.

6. An alternating-current system comprising an alternating-current circuit, a magneto-mechanical vibrator designed to react by magnetostriction upon the system at a predetermined frequency of the current of the system, the vibrator being adapted to vibrate mechanically when stimulated magnetically and to respond magnetically when vibrated mechanically, and means for amplifying the energy of the circuit.

7. An alternating-current system comprising a space-current device having an input circuit and an output circuit, a magneto-mechanical vibrator connected with the system and so designed that it shall react by magneto-striction upon the current flowing in the system at a predetermined frequency of the current, an amplifier for amplifying the energy of the system and having an input circuit and an output circuit, and a source of energy for the first-named output circuit, and for polarizing the vibrator.

8. The combination with an alternating-current generator, of a magneto-mechanical vibrator connected in circuit with the generator and so designed that a natural frequency of mechanical vibration of the vibrator shall be substantially equal to a predetermined frequency of the alternating current, whereby the vibrator will react upon the alternating current by magnetostriction at substantially the said frequency when stimulated magnetically and to respond magnetically by magnetostriction when vibrated mechanically, whereby the frequency of the alternating current is maintained substantially constant.

9. A space-current device having an input circuit and an output circuit, and magnetostrictive means for coupling the circuits together through the magnetostrictive action of the magnetostrictive means.

10. An oscillating system comprising a space-current device and a magnetostrictive vibrator associated with the device and designed together through the magnetostrictive action of the vibrator to produce oscillations of substantially constant frequency.

11. An oscillating system comprising two vacuum tubes coupled together and each having an input circuit and an output circuit, and a magneto-mechanical vibrator comprising a coil in the input circuit of one of the tubes and a coil in the output circuit of the other tube and having a magnetostrictive member subjected to the electromagnetic fields of the coils, the magnetostrictive member being adapted to vibrate mechanically by magnetostriction when stimulated magnetically and to respond magnetically by magnetostriction when vibrated mechanically and being designed, through the magnetostrictive action of the magnetostrictive member, to maintain the frequency of the oscillations substantially constant.

12. An oscillating system comprising two circuits and means for transferring energy from one of the circuits to the other circuit, and a magneto-mechanical vibrator connected with the system to vibrate mechanically by magnetostriction when stimulated magnetically and to respond magnetically by magnetostriction when vibrated mechanically, the vibrator being designed to feed back magnetostrictively from the said other circuit to the said one circuit to maintain the frequency of the oscillations substantially constant.

13. An oscillating system comprising a circuit that is normally non-oscillating, and a magneto-strictive vibrator designed and connected to cause the circuit to oscillate through the magnetostrictive action of the vibrator.

14. An oscillating system comprising an input circuit and an output circuit, the system being normally non-oscillating, and a magneto-mechanical vibrator connected with the system, the vibrator being adapted to vibrate mechanically by magnetostriction when stimulated magnetically and to respond magnetically by magnetostriction when vibrated mechanically and being designed, through the magnetostrictive action of the vibrator, to render the system oscillating and at substantially constant frequency.

15. An oscillatory system comprising a space-current device comprising three electrodes, namely, a filament, a grid and a plate, a coil connecting one of the electrodes with a second electrode, a coil connecting the said one electrode with the third electrode, and a magneto-mechanical vibrator extending through the coils, the vibrator being adapted to vibrate mechanically by magnetostriction when stimulated magnetically and to respond magnetically by magnetostriction when vibrated mechanically.

16. An oscillatory system comprising a space-current device comprising a filament, a grid and a plate, a coil connecting the filament and the grid, a coil connecting the filament and the plate, the coils being wound in opposite directions, and a magneto-mechanical vibrator extending through the coils, the vibrator being adapted to vibrate mechanically by magnetostriction when stimulated magnetically and to respond magnetically by magnetostriction when vibrated mechanically.

17. An oscillating system comprising a space-current device comprising a filament, a grid and a plate, a magneto-mechanical vibrator connected with the space-current device, means for causing the vibrator to vibrate mechanically by magnetostriction when stimulated magnetically and to respond magnetically by magnetostriction when vibrated mechanically, and means for tuning the system.

18. An oscillating system, comprising a driving element, a controlling element, a magnetostrictive element, means for communicating energy from the driving element to the controlling element by the intermediation of the magnetostrictive action of the magnetostrictive element, and means whereby the controlling element modulates the energy of the driving element.

19. The combination with a tunable alternating-current circuit having a winding in circuit therewith, of a magnetostrictive vibrator subjected to the electromagnetic field produced by the winding and so designed that a natural frequency of mechanical vibration of the vibrator shall be substantially equal to a predetermined frequency of the alternating current, and means for varying the frequency of the alternating current to tune the circuit into substantial resonance with the vibrator, whereby the vibrator will vibrate mechanically by magnetostriction at substantially the said frequency when magnetically stimulated by the electromagnetic field and will respond magnetically by magnetostriction when vibrated mechanically.

In testimony whereof, I have hereunto subscribed my name.

GEORGE W. PIERCE.